United States Patent
David et al.

(10) Patent No.: US 8,478,304 B1
(45) Date of Patent: Jul. 2, 2013

(54) METHODS AND SYSTEMS FOR ASSOCIATING LOCATION INFORMATION WITH A WIRELESS LOCAL AREA NETWORK

(75) Inventors: Ram Adva Fish David, Menlo Park, CA (US); Dilip Raghu Kenchammana-Hosekote, Menlo Park, CA (US); Alistair Edwin Adams, San Carlos, CA (US)

(73) Assignee: Nokia Corporation, Espoo (FI)

( * ) Notice: Subject to any disclaimer, the term of this patent is extended or adjusted under 35 U.S.C. 154(b) by 1454 days.

(21) Appl. No.: 11/820,457

(22) Filed: Jun. 18, 2007

Related U.S. Application Data (60) Provisional application No. 60/814,344, filed on Jun. 16, 2006.

(51) Int. Cl.
    *H04W 24/00* (2009.01)
(52) U.S. Cl.
    USPC ............... 455/456.5; 455/456.1; 455/435.1; 455/435.2
(58) Field of Classification Search
    USPC ................. 455/456.5, 435.1, 435.2
    See application file for complete search history.

(56) References Cited

U.S. PATENT DOCUMENTS

| | | | |
|---|---|---|---|
| 7,277,710 B1 * | 10/2007 | Jones et al. | 455/456.1 |
| 7,536,186 B2 * | 5/2009 | Dorenbosch et al. | 455/440 |
| 2002/0142792 A1 * | 10/2002 | Martinez | 455/550 |
| 2003/0022675 A1 * | 1/2003 | Mergler | 455/456 |
| 2004/0027251 A1 * | 2/2004 | Sharony | 340/825.49 |
| 2004/0203695 A1 * | 10/2004 | Mikan | 455/419 |
| 2006/0079201 A1 * | 4/2006 | Chung et al. | 455/410 |
| 2007/0223432 A1 * | 9/2007 | Badarinath | 370/338 |

* cited by examiner

*Primary Examiner* — Nimesh Patel
(74) *Attorney, Agent, or Firm* — Ditthavong Mori & Steiner P.C.

(57) ABSTRACT

A mobile device operating in a cellular communication network determines its current location via the cellular communication network, for example, by triangulation of the base stations of the cellular communication network. At its current location, the mobile device also detects a wireless local area network (WLAN) such as a Wi-Fi network. The mobile device then sends the location information and an ID of the WLAN to a network based database server, which creates an entry to store data associating the location information with the WLAN. The mobile device can also store data associating the location with the WLAN in a local storage.

15 Claims, 10 Drawing Sheets

| WID 501 | | LOCATION 504 | | TIME STAMP 507 |
|---|---|---|---|---|
| PRIMARY WID 502 | SECONDARY WID 502 | TYPE 505 | DESCRIPTION 506 | |
| " | " | | | |

METHODS AND SYSTEMS FOR ASSOCIATING LOCATION INFORMATION WITH A WIRELESS LOCAL AREA NETWORK

This application claims the benefit of U.S. Provisional patent application No. 60/814,344, filed on Jun. 16, 2006, and entitled, "Methods to geographically locate a WiFi network from either GSM location information or neighboring WiFi networks which are at a known location and use this information to geographically locate a WiFi device", which is incorporated herein by reference.

FIELD OF THE INVENTION

This invention relates to providing location information to a wireless local area network (WLAN). More specifically, this invention relates to using a mobile device (e.g., a cell phone, PDA, smartphone, etc.) to associate location information with a WLAN.

BACKGROUND

Wireless local area networks (WLANs) such as Wi-Fi networks are becoming more and more popular nowadays. Today, there are a large number of Wi-Fi networks deployed around the world, for example, in residential areas, cafes, office buildings, etc. Wi-Fi networks, however, do not have geographic locations associated with them. Neither does the Wi-Fi standard provide for the geographic location for a Wi-Fi network. In addition, due to inherently decentralized nature of Wi-Fi networks, there is no central body for establishing and maintaining updated location information for each Wi-Fi network. Thus, a system and method for creating and maintaining a centralized database that contains data associating location information with each of a large number of Wi-Fi networks deployed around the world is desired.

DETAILED DESCRIPTION

A technique for automatically associating location information with a wireless local area network (WLAN) is disclosed. The technique includes determining a location of a mobile device via a cellular communication network and detecting a WLAN by the mobile device at the location. The technique further includes storing data that associates the location with the WLAN. In one embodiment, the location information may be obtained by other location sensing technologies on mobile devices that have such capabilities (e.g. GPS/AGPS-capable phones), instead of or in combination with location information from the cellular communication network.

Another aspect of the invention provides a technique for determining a WLAN's location by location information associated with its neighboring WLANs. The technique includes detecting, by a mobile device, a first WLAN and a second WLAN at a same location; retrieving location information associated with the first WLAN; and storing data that associates said location information with the second WLAN.

Yet another aspect of the invention provides a technique for automatically switching a mobile device's settings from a first setting to a second setting, based on the mobile device's current location. In one embodiment, switching a mobile device's settings from a first setting to a second setting includes setting presence, setting a custom status message, or deciding which Wi-Fi network to select from a plurality of Wi-Fi networks available at the location.

In the following description, numerous specific details are set forth. However, it is understood that embodiments may be practiced without these specific details. For example, well known equivalent components may be used in place of those described herein. In other instances, well known components have not been shown in detail in order not to obscure the understanding of this description.

Figure 1:
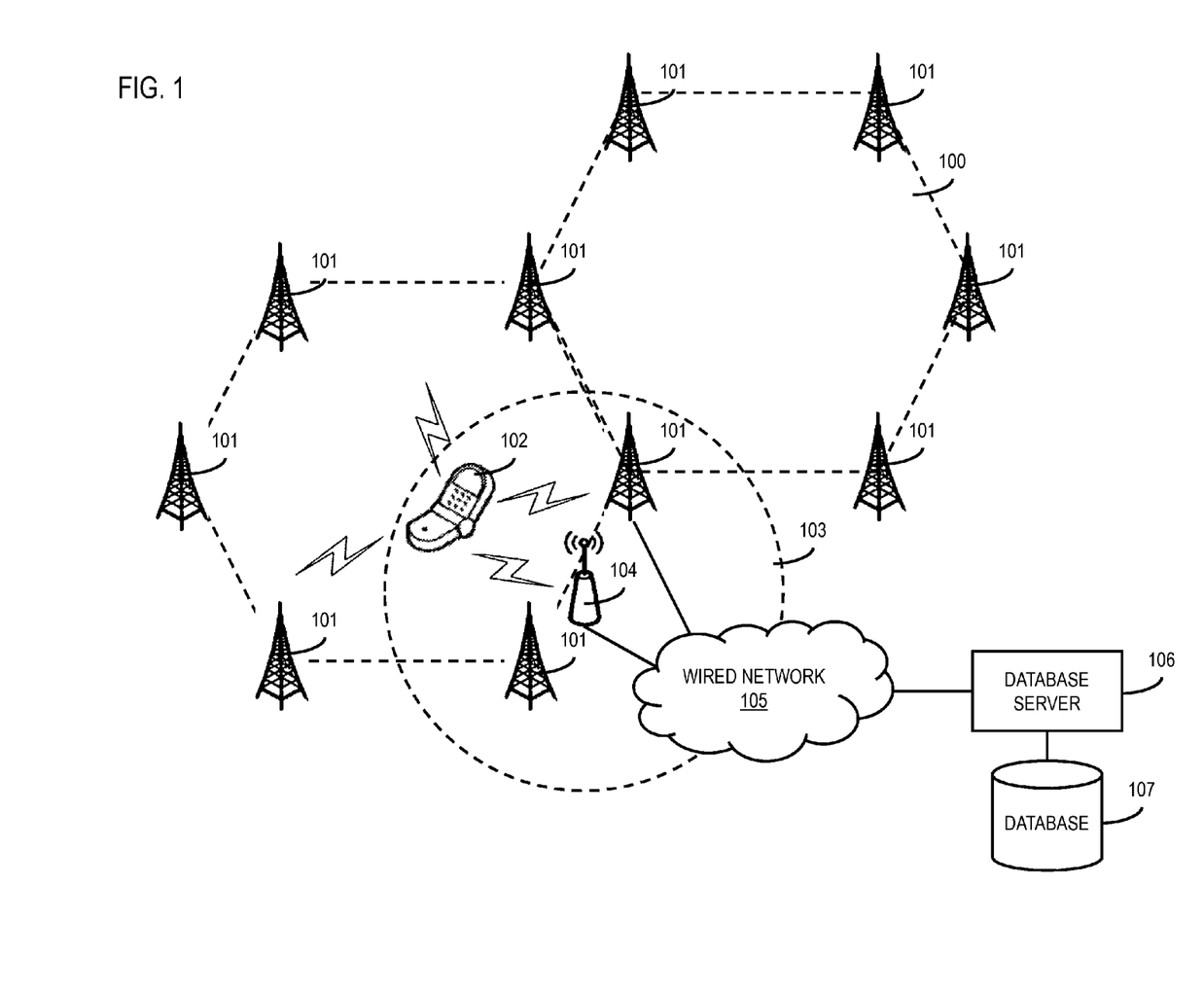
FIG. 1 illustrates a network environment in which the present invention can be implemented.

FIG. 1 illustrates a network environment in which the present invention can be implemented. As shown, one or more mobile devices 102 (such as a cell phone, a PDA, or a smartphone) can operate in a cellular communication network 100 that includes a number of base stations 101. The cellular communication network 100 can be a Global system for Mobile communications (GSM) network, a Code Division Multiple Access (CDMA) network, etc. and variants thereof, e.g., 3G, HSPDA, EDGE, EV-DO, etc. A wireless local area network (WLAN) 103 such as a Wi-Fi network can be deployed within the covered area of the cellular communication network 100. The WLAN 103 has an access point 104 that can connect one or more wireless devices, including the mobile device 102. In one embodiment, the mobile device 102 has the capability of connecting to both the WLAN 103 and the cellular communication network 100.

Also shown in FIG. 1 is a database server 106 which connects to a database 107. The database server 106 is connected to the cellular communication network 100 and the WLAN 103 via a wired network 105. In one embodiment, the mobile device 102 can determine its current location via the cellular communication network 100. One or more techniques are available to determine a mobile device's location via a cellular communication network. These techniques include, but are not limited to, triangulation of base stations 101, requesting location information from a service provided by the cellular communication network (e.g., GSM location service, etc.) or a third party, etc. Upon determining the current location, the mobile device 102 detects all nearby WLANs (including WLAN 103). The mobile device 102 then sends a request to each of the detected WLANs to request an identifier (ID) that identifies the corresponding WLAN. The mobile device 102 then sends the location information together with the ID received from each WLAN to the database server 106, which stores, into the database 107, data associating the location information with each WLAN. In one embodiment, the mobile device 102 sends the location information and the ID to the database server 106 via a network path including the cellular communication network 100 and the wired network 105. Alternatively, the mobile device 102 can send the location information and ID via a network path including the WLAN 103 and the wired network 105. Thus, one or more mobile devices that are capable of working with a cellular communication network as well as WLAN networks can be used to create a centralized database storing data associating location information with each of a large number of WLANs.

Note that distributed databases, instead of a centralized database, can be used to store data associating location information with each WLANs. Each of the distributed databases can be responsible for storing location information associated with WLANs of a particular geographic area.

Figure 2A:
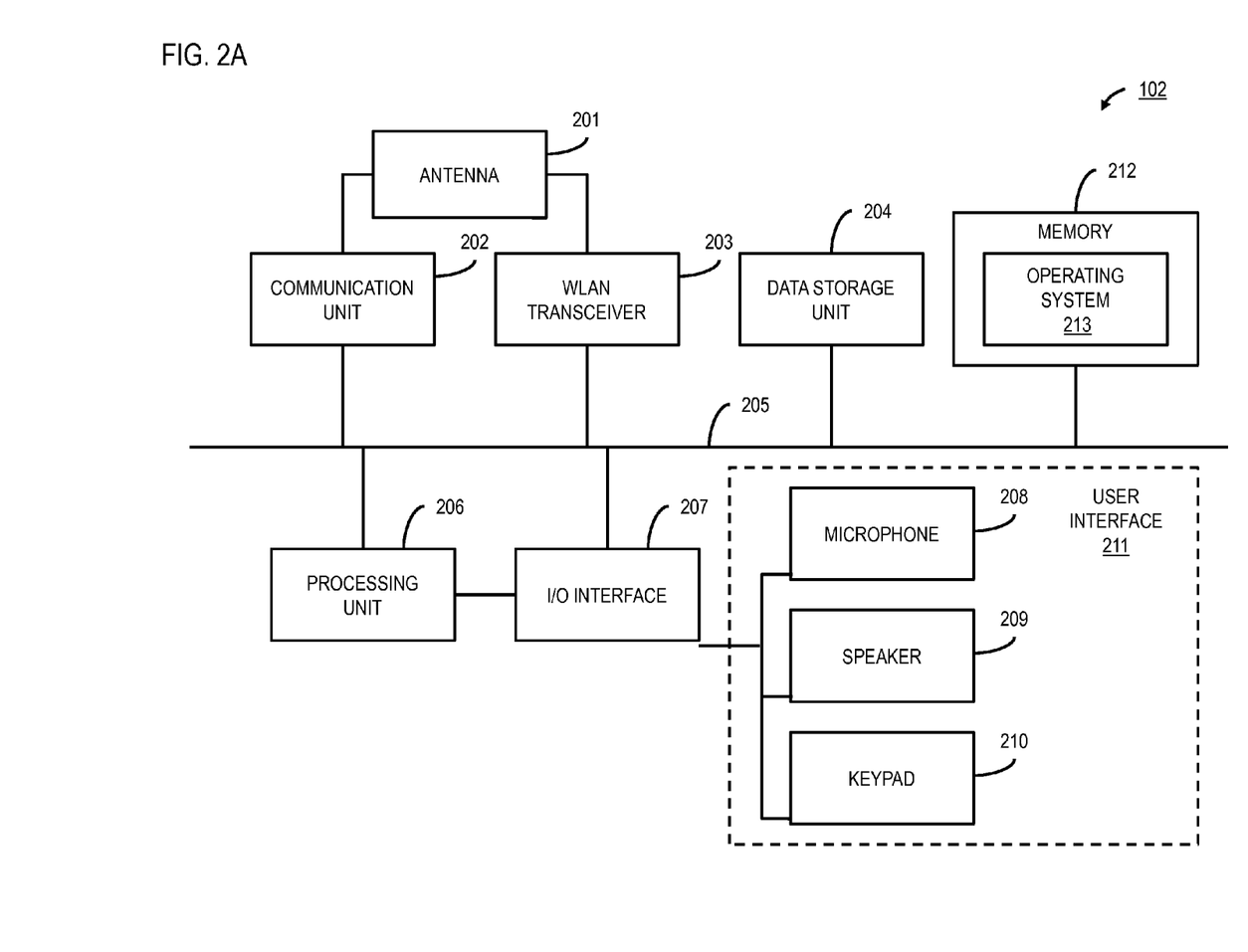
FIG. 2A is a high level block diagram of a mobile device (shown in FIG. 1)

FIG. 2A is a high level block diagram of a mobile device (shown in FIG. 1). As shown, the mobile device 102 may be any device capable of receiving and transmitting data. The mobile device 102 contains a processing unit 206 that is communicatively coupled to the other components of the mobile device 102 via a bus 205.

The mobile device 102 also includes memory 212 coupled to the bus 205. The memory 212 represents any form of random access memory (RAM), read-only memory (ROM), flash memory, or a combination thereof. Memory 212 stores, among other things, the operating system 213 of the mobile device 102.

The mobile device 102 contains a data storage unit 204. The data storage unit 204 may be or include any conventional medium for storing data in a non-volatile manner. The processing unit 206 and the data storage unit 204 may communicate via the bus 205. Memory 212 and data storage unit 204 store software instructions and/or data, which may include instructions and/or data used to implement the techniques introduced here.

The mobile device 102 also includes I/O interface 207, which may reside on the same microprocessing chip as the processing unit 206. However, I/O interface 207 may also reside on an external unit. I/O interface 207 connects the processing unit 206 to a user interface 211. In one embodiment, the user interface 211 comprises keypad input 210, microphone input 208, and speaker output 209. The I/O interface 207 may include an analog-to-digital converter for converting an analog microphone signal to a digital signal for use by the processing unit 206. The I/O interface 207 may also include a digital-to-analog converter to convert digital information from the processing unit 206 to the speaker 209, such as voice data.

The processing unit 206 transmits and receives digital signals which are to be communicated outside the mobile device 102 via the communication unit 202. The communication unit 202 is connected to an antenna 201, which communicates signals through airwaves to the cellular communication network 100 via a base station 101 (shown in FIG. 1). The mobile device 102 also includes a wireless local area network (WLAN) transceiver 203 to communicate wirelessly with a WLAN (such as a Wi-Fi network) via the antenna 201. The WLAN transceiver 203 is coupled with the processing unit 206 via the system bus 205.

Figure 2B:
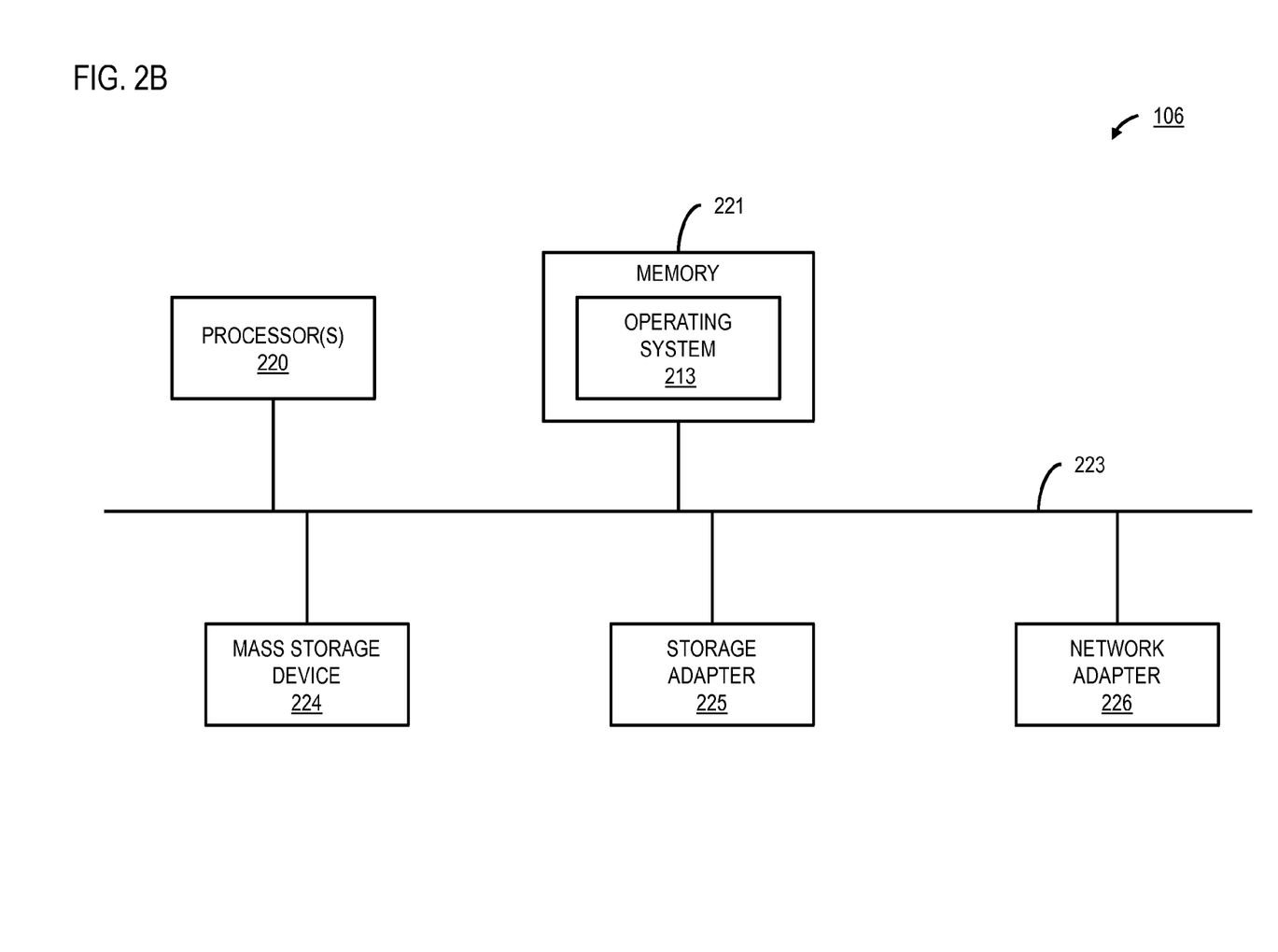
FIG. 2B is a high level block diagram of a database server (shown in FIG. 1)

FIG. 2B is a high level block diagram of a database server (shown in FIG. 1). Certain standard and well-known components which are not germane to the present invention are not shown. The database server 106 includes one or more processors 220 coupled to a bus system 223.

The bus system 223 in FIG. 2B is an abstraction that represents any one or more separate physical buses and/or point-to-point connections, connected by appropriate bridges, adapters and/or controllers. The bus system 223, therefore, may include, for example, a system bus, a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

The processors 220 are the central processing units (CPUs) of the database server 106 and, thus, control the overall operation of database server 106. In certain embodiments, the processors 220 accomplish this by executing software stored in memory 221. A processor 220 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The database server 106 also includes memory 221 coupled to the bus system 223. The memory 221 represents any form of random access memory (RAM), read-only memory (ROM), flash memory, or a combination thereof. Memory 221 stores, among other things, the operating system 222 of the database server 106.

Also connected to the processors 220 through the bus system 223 are a mass storage device 224, a storage adapter 225, and a network adapter 226. Mass storage device 224 may be or include any conventional medium for storing large quantities of data in a non-volatile manner, such as one or more disks. The storage adapter 225 allows the database server 106 to access the database 107 (shown in FIG. 1). The network adapter 226 provides the database server 106 with the ability to communicate with remote devices and may be, for example, an Ethernet adapter or a Fibre Channel adapter.

Memory 221 and mass storage device 224 store software instructions and/or data, which may include instructions and/or data used to implement the techniques introduced here. The system may include other components (e.g., input devices, such as a mouse and keyboard, and output devices such as a display).

Figure 3:
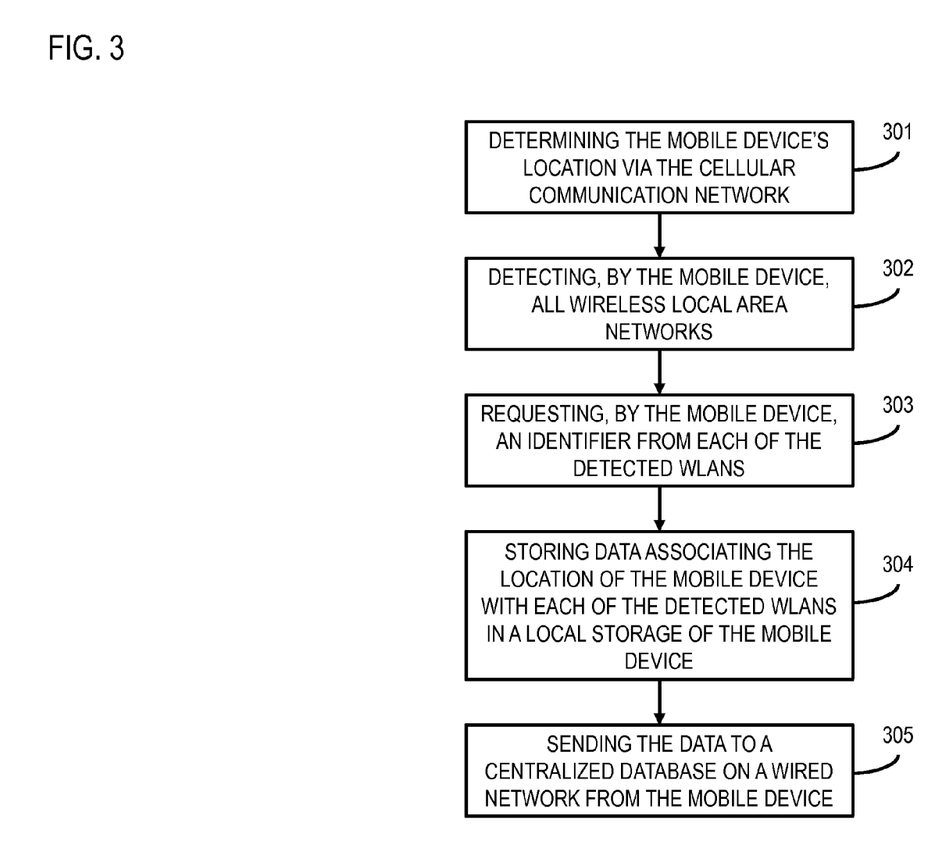
FIG. 3 is a flow diagram illustrating a process of using a mobile device (shown in FIG. 1) to associate location information with a wireless local area network (WLAN)

FIG. 3 is a flow diagram illustrating a process of using a mobile device (shown in FIG. 1) to associate location information with a wireless local area network (WLAN). In one embodiment, the process is implemented in a mobile device that operates in a cellular communication network and can also connect to a WLAN (e.g., a dual-mode mobile device). At block 301, the process determines the mobile device's location via the cellular communication network. As discussed above, there are several techniques available for obtaining a mobile device's location. These techniques include, but are not limited to, triangulation of base stations, obtaining location information from a service provided by the cellular communication network (e.g., GSM location service, etc.), obtaining location information from a third party service, etc. In one embodiment, the location information may be obtained by other location sensing technologies on the mobile device, such as a GPS or AGPS, instead of or in combination with location information from the cellular communication network. The determined location can be represented by a data structure organizing information including the mobile device's latitude and longitude, the street address (which may be obtained by reverse geocoding), etc. At block 302, the process uses the mobile device's WLAN transceiver to try to detect all of the nearby WLANs. At block 303, the process sends a request to each of the detected WLANs to request an identifier (ID) of the corresponding WLAN. In one embodiment, the ID can be the MAC address of the access point of the WLAN. Alternatively, a set of information including the access point's IP address, IDs of neighboring WLANs, for example, can be used for secondary identification of the WLAN. At block 304, the process stores data associating the location information with the WLAN's ID in a local storage of the mobile device (such as the data storage unit 204). At block 305, the process sends the data to a database server on a wired or wireless network (such as database server 106 shown in FIG. 1). Note that the process can send the data associating the location information with the WLAN's ID directly to the database server, without sending the data firstly in a local storage at block 304. If that is the case, the process illustrated in FIG. 3 skips block 304.

Figure 4:
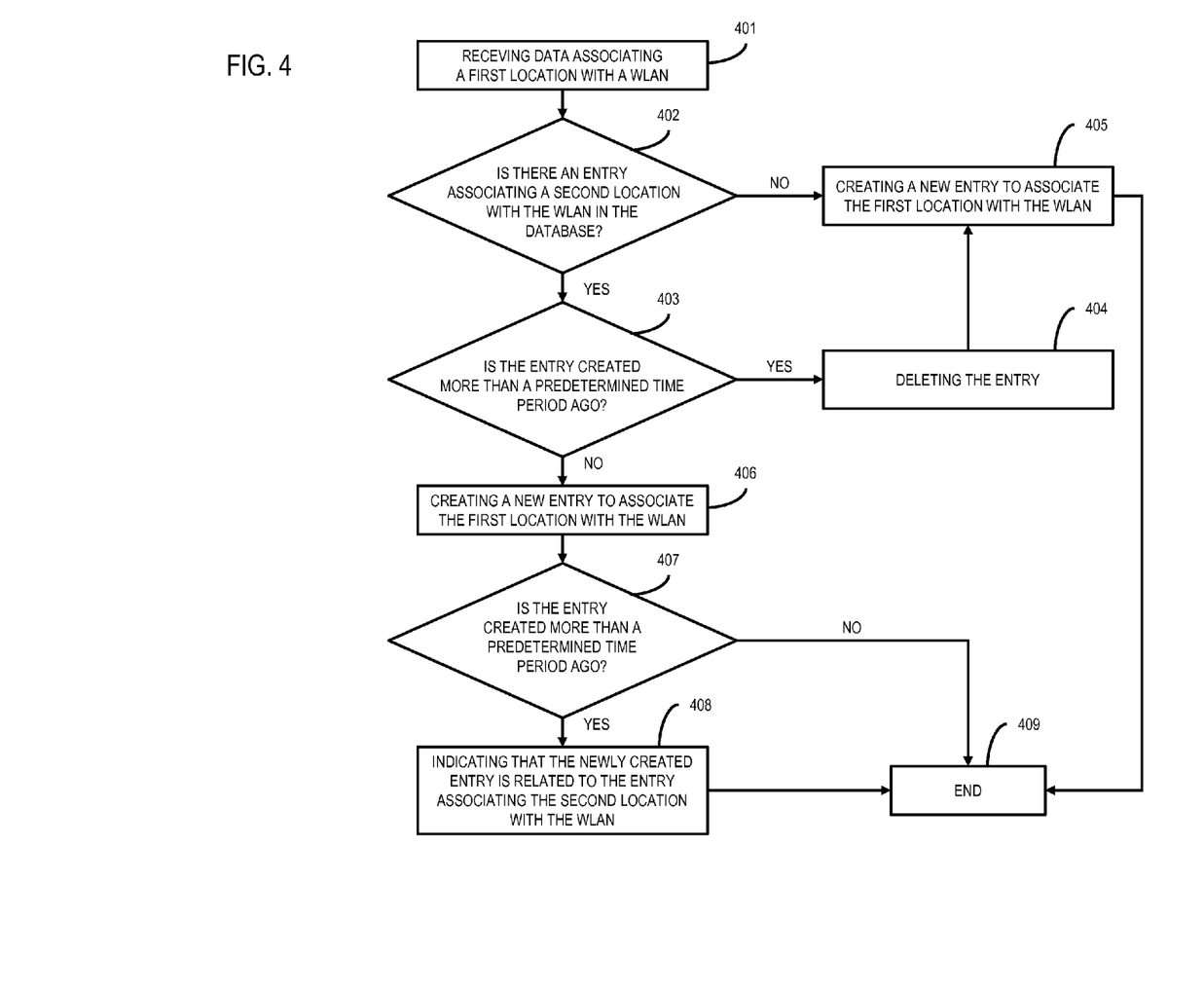
FIG. 4 is a flow diagram illustrating a process of storing data associating location information with WLANs into a database (shown in FIG. 1)

FIG. 4 is a flow diagram illustrating a process of storing data associating location information with WLANs into a database (shown in FIG. 1). The process illustrated in FIG. 4 may be implemented in the database server 106 shown in FIG. 1. At block 401, the process running at the database server 106 receives data associating a first location with a WLAN, for example, from a mobile device 102. At block 402, the process determines whether there is an entry in the database 107 and such entry stores data associating a second location with the WLAN. In one embodiment, the process uses the WLAN's ID received from the mobile device to search the database 106 to determine whether such a second entry exists. If the answer is positive, the process goes to block 403. At block 403, the process determines whether the entry is created more than a predetermined period of time ago (for example, six months). In one embodiment, when an entry is created in the database 107, a timestamp field is created to record the time the entry is created. If the process determines that the entry was created more than a predetermined period of time ago, the process goes to block 404, where the process deletes the entry. From block 404, the process goes to block 405. Also, if the process determines that there is no such entry associating a second location with the WLAN in the database 107, the process goes to block 405 as well. At block 405, the process creates a new entry to store data received from the mobile device (such data associating the first location with the WLAN). Then, the process ends at block 409.

If the entry was created within the predetermined period of time, the process goes to block 406. At block 406, the process creates a new entry in the database 107. The new entry stores data received from the mobile device (the data associating the first location with the WLAN). At block 406, the process determines whether the first location is close to the second location. In one embodiment, if the distance between the first location and the second location is less than a predetermined value (such as 10 meters), the first location is considered close to the second location. If the process determines that the first location is close to the second location, the process goes to block 408. Otherwise, the process ends at block 409. At block 408, the process indicates, in the database, that the newly created entry is related to the entry storing data associating the second location with the WLAN.

Figure 5:
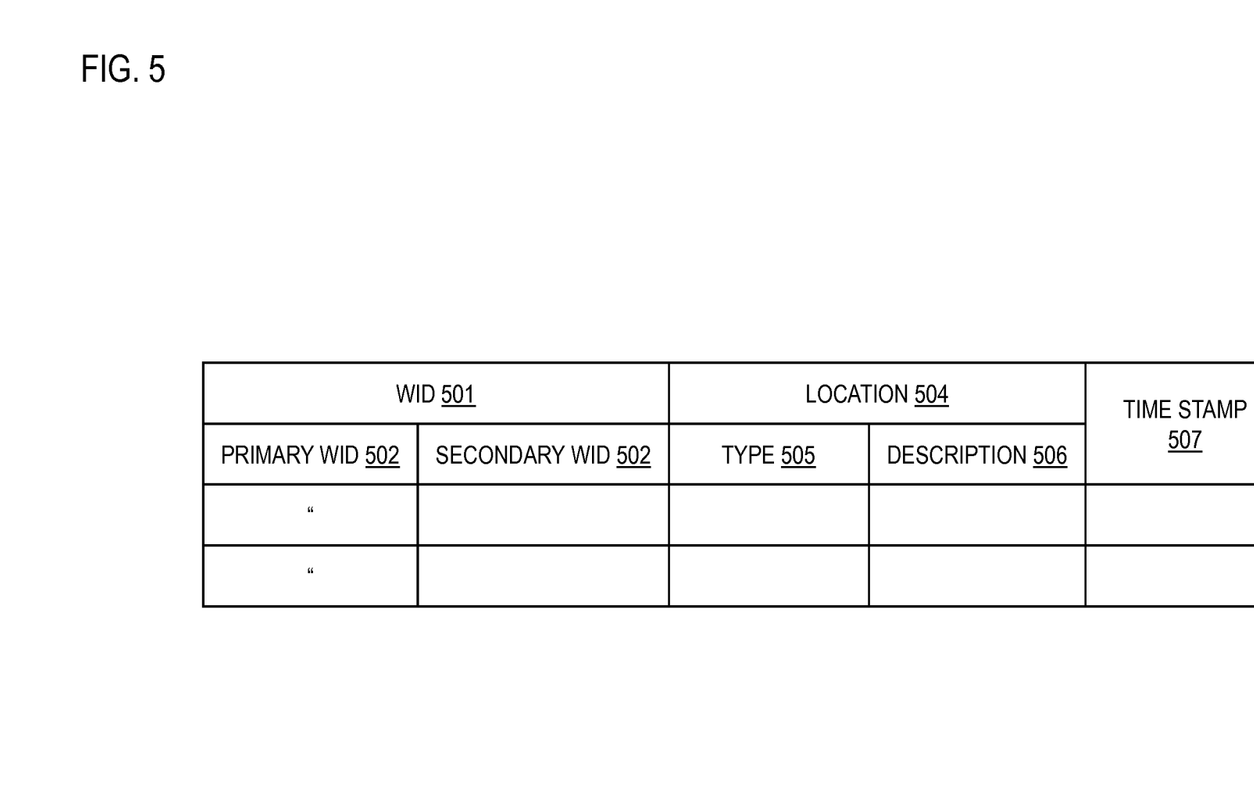
FIG. 5 illustrates an example of a database schema storing data associating location information with WLANs.

FIG. 5 illustrates an example of a database schema storing data associating location information with WLANs. As shown, the schema includes a WID (Wireless Local Area Network Identifier) field 501, which further includes a primary WID portion 502 and a secondary WID portion 503. In one embodiment, the primary WID portion is the Media Access Control (MAC) address of the WLAN's access point. The secondary WID portion 503 may be a combination of information that includes a service set identifier (SSID) of the WLAN, the Internet Protocol (IP) address of the access point, the received signal strength indication (RSSI) of the WLAN at the mobile device that detected the WLAN. The schema further includes a location field 504, which includes a type portion 505 and a description portion 506. The type portion 505 indicates what type of location this entry records. For example, the type of location could be a latitude-longitude type of location, GSM cell ID type of location, GSM tower ID type of location, street address, etc. The description 506 includes data describing the position of the location. The schema also includes a timestamp 507 which records the time when an entry was created in the database 107.

Note that the above description of the database schema is an example of implementing the present invention. The example is given for illustration purposes, and it does not limit the implementation of the invention to the above described way.

Figure 6:
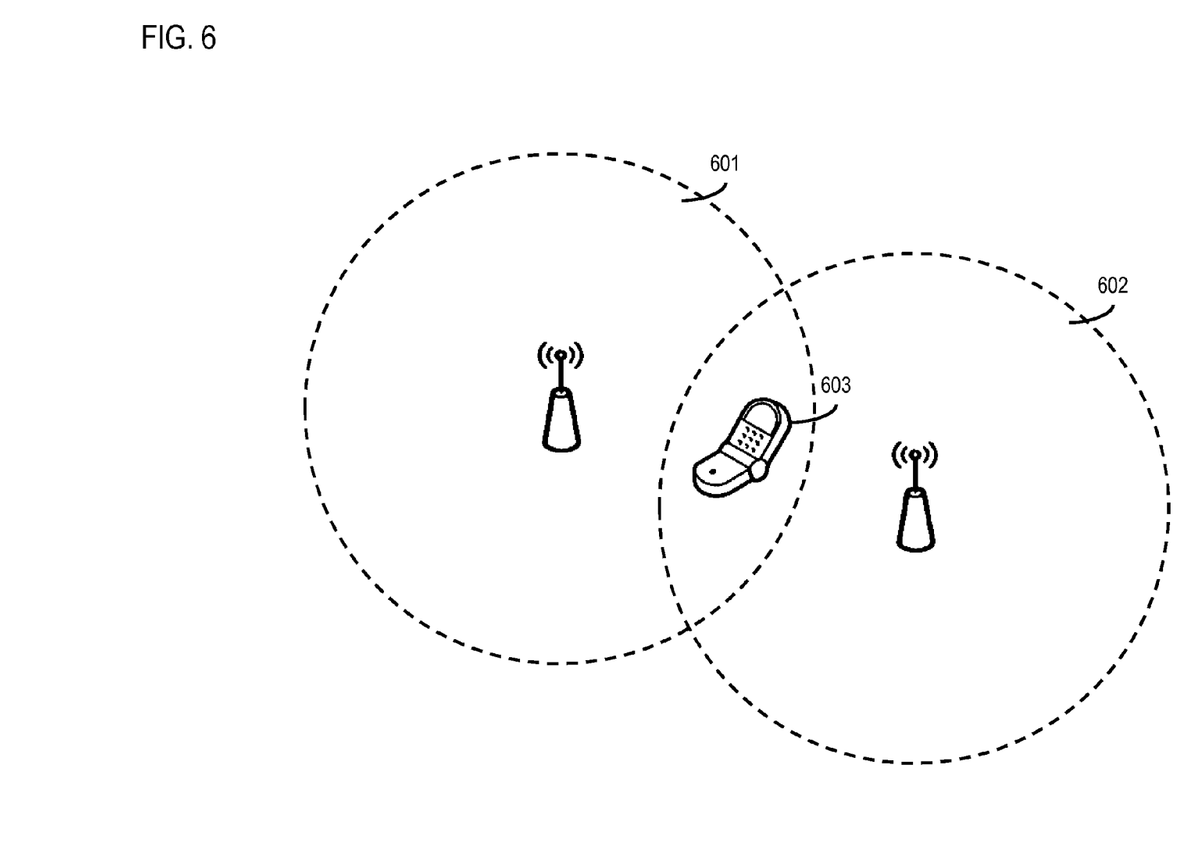
FIG. 6 illustrates an example of locating a WLAN by using a neighbor WLAN's location information.

FIG. 6 illustrates an example of locating a WLAN by using a neighbor WLAN's location information. In one embodiment, a mobile device can detect more than one WLAN at a particular location. For example, as shown in FIG. 6, the mobile device 603 detects WLAN 601 and WLAN 602 at a location. As discussed above, the mobile device 603 can execute the process illustrated in FIG. 3 to associate the location of the mobile device with each of the WLANs 601-602. Yet in another embodiment of the present invention, if a location has already been associated with one of the WLANs, for example, WLAN 601, instead of determining the location of the mobile device 603 via the cellular communication network (for example, by triangulation of the base stations, or by requesting from a cellular network service or third party service), the mobile device 603 retrieves the location information associated with WLAN 601 and associates the retrieved location information with WLAN 602. In one embodiment, the mobile device 603 retrieves such data from its local storage (data storage unit 204, for example). Alternatively, the mobile device 603 retrieves such data from the database server 106 through a network path.

Figure 7:
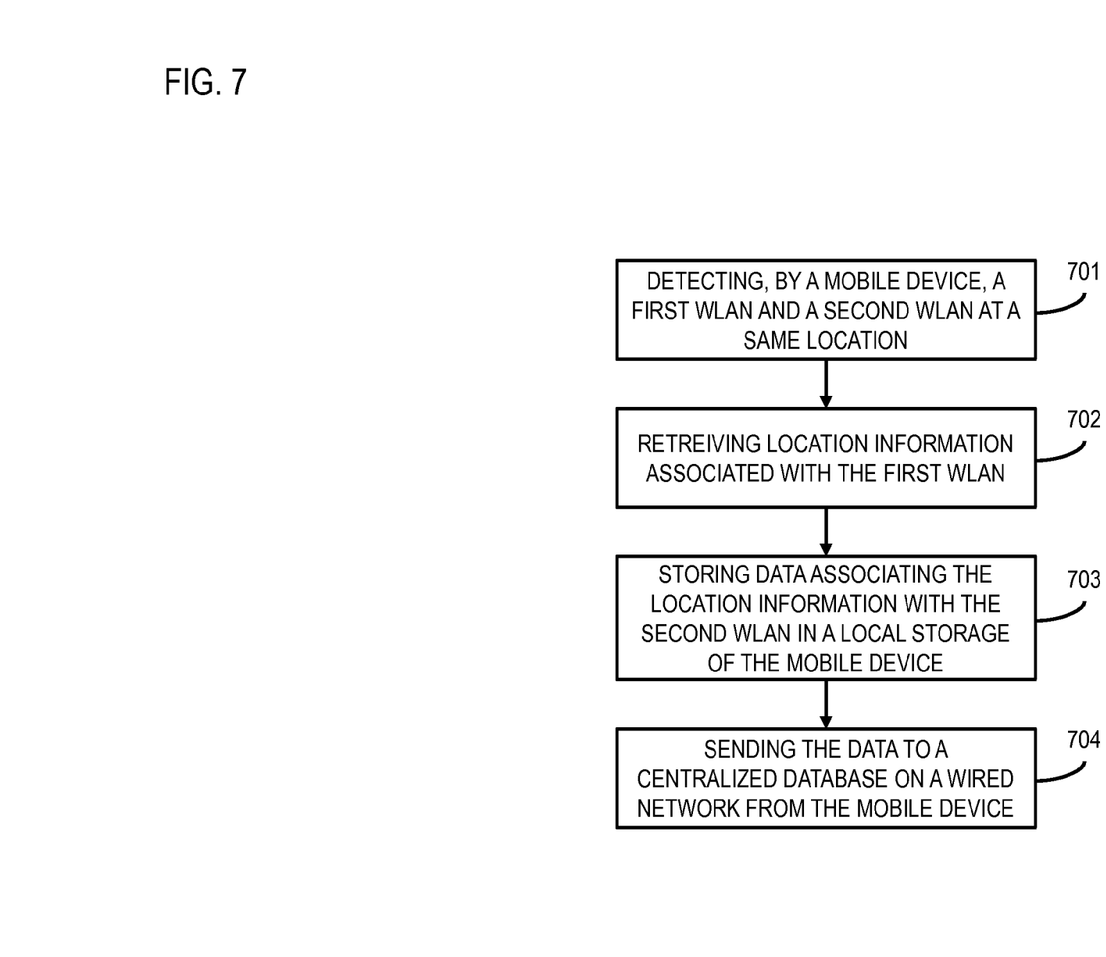
FIG. 7 is a flow diagram illustrating a process of locating a WLAN by using a neighbor WLAN's location information.

FIG. 7 is a flow diagram illustrating a process of locating a WLAN by using a neighbor WLAN's location information. The process can be implemented in the mobile device 605 shown in FIG. 6. At block 701, the process detects a first WLAN and a second WLAN. At block 702, the process retrieves data associating a location with the first WLAN. In one embodiment, the process retrieves such data from the mobile device's local storage. Alternatively, the process retrieves such data from the database server 106 via a network path, for example, the cellular communication network 100 and the wired network 105 shown in FIG. 1. At block 703, the process stores data associating the retrieved location information with the second WLAN in a local storage of the mobile device. At block 704, the process sends the data to the database server 106 via the network path. The database server 106, upon receiving the data, stores the data into the database 107, according to the process illustrated in FIG. 4.

Figure 8:
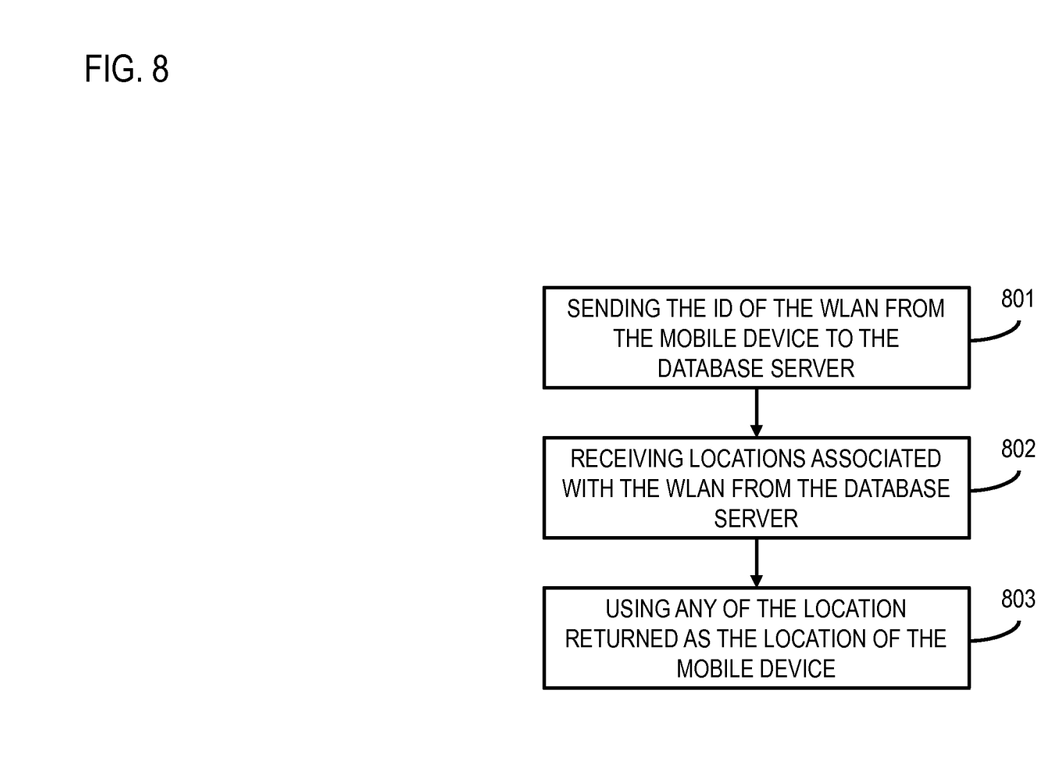
FIG. 8 is a flow diagram illustrating a process of locating a mobile device by using a WLAN's location information.

FIG. 8 is a flow diagram illustrating a process of locating a mobile device by using a WLAN's location information. At block 801, a mobile device detects a WLAN. The mobile device requests the ID of the WLAN and sends the ID to the database server 106, for example, via the cellular communication network. At block 802, the mobile device receives locations associated with the ID of the WLAN from the database server 106. At block 803, the mobile device can use any of the returned locations as the mobile device's location.

Thus, instead of using the cellular communication network to determine the mobile device's location, the mobile device can use nearby WLANs to locate itself.

Figure 9A:
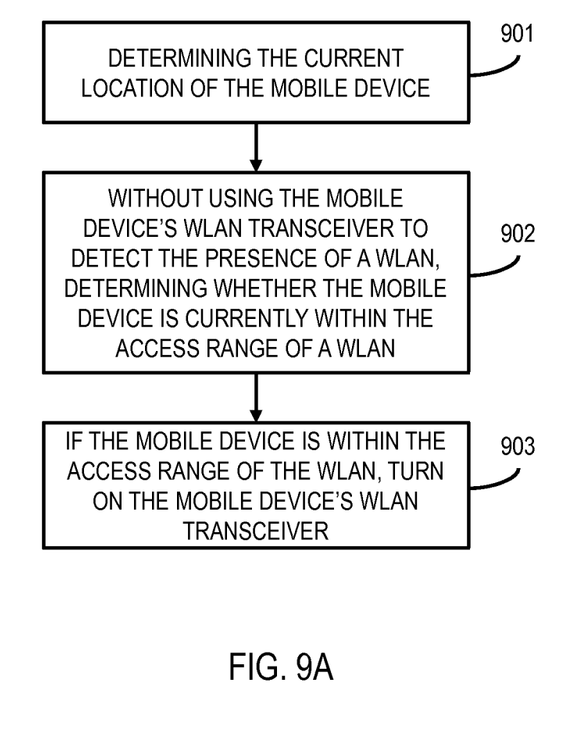
FIG. 9A is a flow diagram illustrating a process of automatically changing the settings of a mobile device depending on the current location of the mobile device.

FIG. 9A is a flow diagram illustrating a process of automatically changing the settings of a mobile device depending on the current location of the mobile device. As shown in FIG. 2A, a mobile device can work with both the cellular communication network and WLANs. However, to work with a WLAN, the mobile device will need to use the WLAN transceiver, which consumes significant amount of power. Operations that consume significant amount of power of the mobile device also include using the WLAN transceiver to detect the presence of nearby WLANs. Without using the transceiver to detect nearby WLANs, the technique introduced below determines whether the mobile device is within the access range of a WLAN. If the mobile device is within the access range of a WLAN, the process automatically turns on the power of the transceiver to allow the mobile device to connect to the WLAN.

At block 901, the process running in a mobile device determines the current location of the mobile device. At block 902, without using the mobile device's WLAN transceiver to detect the presence and signal strength of nearby WLANs, the process determines whether the mobile device is within the access range of a WLAN, based on the mobile device's current location and the WLANs associated with that location. In one embodiment, the WLANs associated with the location can be retrieved from a local storage of the mobile device or retrieved from the database server 106 via a network path (the cellular communication network, for example). To determine whether the mobile device is within the access range of the WLAN, the process calculates the distance between the current location of the mobile device and the location associated with the WLAN. In one embodiment, if the distance is less than a predetermined value (100 meters, for example), the mobile device is determined to be within the access range of the WLAN. In another embodiment of the present invention, the location information retrieved may include the RSSI of the WLAN. Whether or not the mobile device is within the access range of the WLAN is further determined based on the RSSI of the WLAN. If the RSSI is high, then the predetermined value can be increased since the signal from the WLAN is relatively strong. If the RSSI is low, then the predetermined value should be reduced to a lower value to ensure that the mobile device is able to receive strong signal from the WLAN.

At block 903, if the mobile device is determined to be within the access range of the WLAN, the process automatically turns on the power of the mobile device's WLAN transceiver to enable the mobile device to connect to the WLAN.

In another embodiment of the invention, if the process determines that the mobile device is within the access ranges of more than one WLAN, the process determines which WLAN provides the strongest signal. The process then tries to connect to the WLAN providing the strongest signal.

Figure 9B:
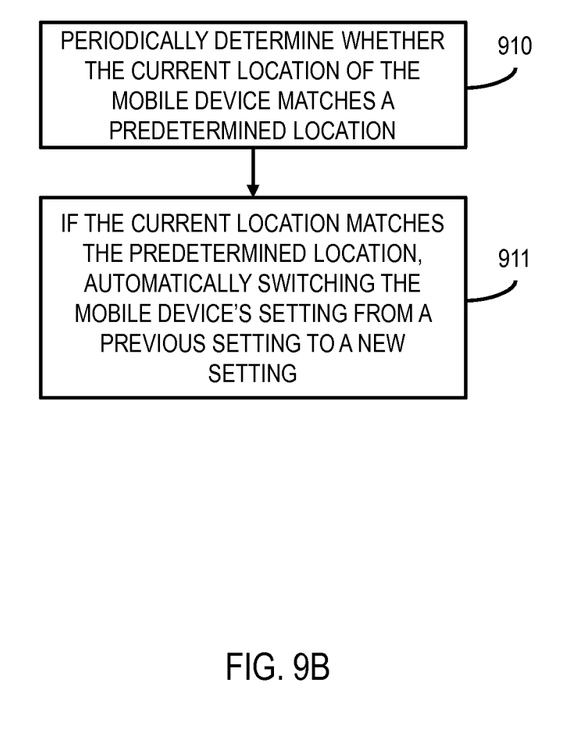
FIG. 9B is a flow diagram illustrating another process of automatically changing the settings of a mobile device depending on the current location of the mobile device.

FIG. 9B is a flow diagram illustrating another process of automatically changing the settings of a mobile device depending on the current location of the mobile device. At block 910, the process periodically determines whether the current location of the mobile device matches a predetermine location. In one embodiment of the present invention, the process determines whether the current location matches one of a list of predetermined locations. Such predetermined location or locations may be stored in a local storage of the mobile device. For example, one of the predetermined locations may be a location associated with the user's home Wi-Fi network, and another predetermined location may be a location associated with the user's work Wi-Fi network. As discussed above, these locations may also be stored in the database 107, and they can be retrieved by the mobile device from the database server 106 via a network path.

At block 911, if the process determines that the current location of the mobile device matches one of the predetermined locations, the process automatically switches the mobile device's setting from a previous setting to a new setting. For example, if the matched location is the user's home location, then the process may set the ring tone louder or set a different ring tone. If, however, the matched location is the user's work location, the process may set the ring as silent to avoid disturbing other people in the work environment. If, for a further example, the matched location is a movie theatre, then, the process may automatically put the mobile device's ring in silent to avoid disturbing audiences in a show. Here, a first location matches a second location if the distance between the two locations is less than a predetermined value (2 meters, for example).

In one embodiment, a plurality of locations can be stored in the mobile device. Each of the locations is associated with a particular setting or preference profile. Such a location may not need to be associated with a WLAN, as described above.

Thus, a method and system for associating location information with a WLAN has been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, a consumer electronic device, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in the illustrative rather than in a restrictive sense.

What is claimed is:

1. A method comprising:
    determining a location of a mobile device; and
    switching a first setting of the mobile device to a second setting of the mobile device, based on the current location,
    wherein the switching a first setting of the mobile device to a second setting of the mobile device, based on the current location, comprises:
    determining whether the current location of the mobile device is within an access range of a wireless local area network (WLAN), without using a WLAN transceiver of the mobile device to detect presence of the WLAN; and
    if the current location is within the access range of the WLAN, automatically turning on the WLAN transceiver, and wherein said determining whether the current location of the mobile device is within an access range of the WLAN comprises:
retrieving location information and a received signal strength indication (RSSI) associated with the WLAN; and
determining whether the current location of the mobile device is within the access range of the WLAN, based on the RSSI and a distance between the current location and the retrieved location.

2. The method of claim 1, wherein said determining a location of a mobile device comprises using triangulation of base stations of a Global System for Mobile communications (GSM) network to determine the location of the mobile device.

3. The method of claim 1, wherein said determining a location of a mobile device comprises obtaining data representing the location from a service provided via a cellular communication network.

4. The method of claim 1, further comprising:
determining to store data that associates the location with the WLAN, which comprises:
requesting, by the mobile device, an identifier (ID) of the WLAN; and
sending said location and ID from the mobile device to a storage.

5. The method of claim 4, wherein said sending is accomplished via anyone of a cellular communication network or the WLAN.

6. The method of claim 1, further comprising:
determining to store data that associates the location with the WLAN, which comprises:
determining to store said data in a local storage of the mobile device.

7. The method of claim 1, wherein said location information is retrieved from anyone of a local storage of the mobile device or a remote storage.

8. The method of claim 1, wherein the switching a first setting of the mobile device to a second setting of the mobile device, based on the current location, further comprises:
associating the second setting with a location; and
if the current location is determined to be near said location, setting the mobile device with the second setting.

9. A method of claim 1, wherein the switching a first setting of the mobile device to a second setting of the mobile device, based on the current location, further comprises changing a ring tone from a first ring tone to a second ring tone that is specific to the location of the device.

10. An apparatus comprising:
at least one processor; and
at least one memory including computer program code for one or more programs,
the at least one memory and the computer program code configured to, with the at least one processor, cause the apparatus to perform at least the following,
determine a location of the apparatus; and
switch a first setting of the mobile device to a second setting of the mobile device, based on the current location,
wherein the switch a first setting of the mobile device to a second setting of the mobile device, based on the current location, comprises:
determine whether the current location of the mobile device is within an access range of a wireless local area network (WLAN), without using a WLAN transceiver of the mobile device to detect presence of the WLAN; and
if the current location is within the access range of the WLAN, automatically turn on the WLAN transceiver, and
wherein said determine whether the current location of the mobile device is within an access range of the WLAN comprises:
retrieve location information and a received signal strength indication (RSSI) associated with the WLAN; and
determine whether the current location of the mobile device is within the access range of the WLAN, based on the RSSI and a distance between the current location and the retrieved location.

11. The apparatus of claim 10, wherein the apparatus is further caused to:
determine to store data that associates the location with the WLAN, wherein the determine to store data comprises:
request a wireless local area network identifier (WID) of the WLAN; and
send said location and WID to a remote storage via any one of the cellular communication network or the WLAN.

12. The apparatus of claim 10 further comprising: a data storage unit, wherein the apparatus is further caused to:
determine to store data that associates the location with the WLAN, wherein the determine to store data comprises:
determine to store said data in a data storage unit.

13. A non-transitory computer-readable storage medium carrying one or more sequences of one or more instructions which, when executed by one or more processors, cause an apparatus to at least perform the following steps:
determine a location of the apparatus; and
switch a first setting of the mobile device to a second setting of the mobile device, based on the current location,
wherein the switch a first setting of the mobile device to a second setting of the mobile device, based on the current location, comprises:
determine whether the current location of the mobile device is within an access range of a wireless local area network (WLAN), without using a WLAN transceiver of the mobile device to detect presence of the WLAN; and
if the current location is within the access range of the WLAN, automatically turn on the WLAN transceiver, and
wherein said determine whether the current location of the mobile device is within an access range of the WLAN comprises:
retrieve location information and a received signal strength indication (RSSI) associated with the WLAN; and
determine whether the current location of the mobile device is within the access range of the WLAN, based on the RSSI and a distance between the current location and the retrieved location.

14. The non-transitory computer-readable storage medium of claim 13, wherein said location information is retrieved from a local storage of the mobile device or a remote storage.

15. The non-transitory computer-readable storage medium of claim claim 13, wherein the switch a first setting of the mobile device to a second setting of the mobile device, based on the current location, further comprises:
associate the first setting with a home location and the second setting with a work location; and
if the current location is determined to be near the work location, set the mobile device with the second setting.

* * * * *